ated June 13, 1967

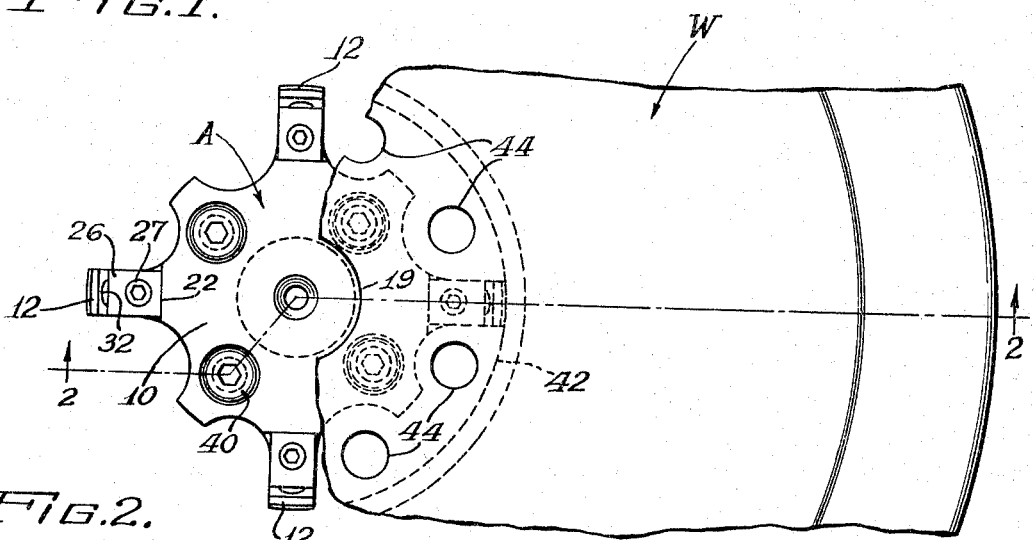
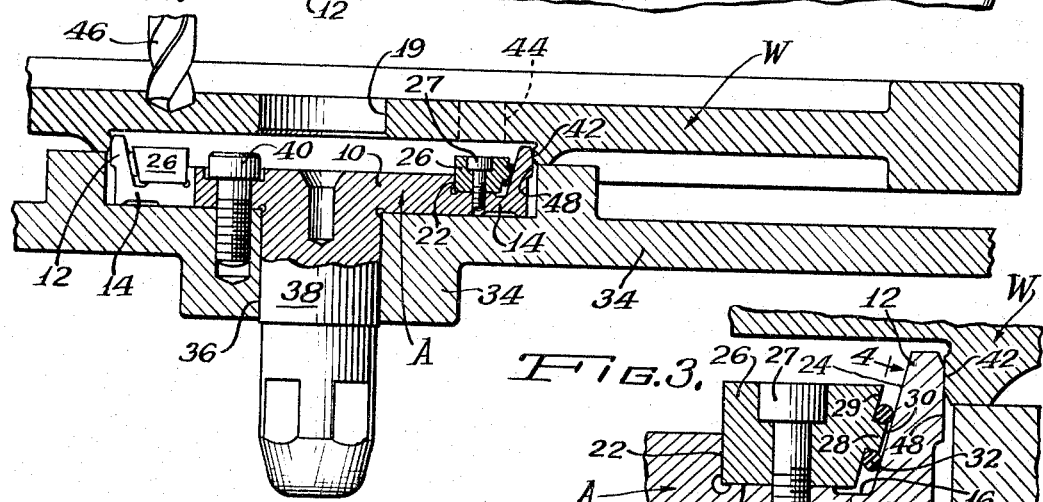
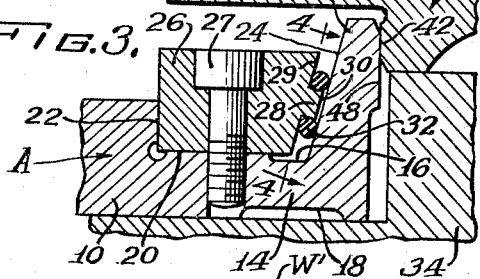
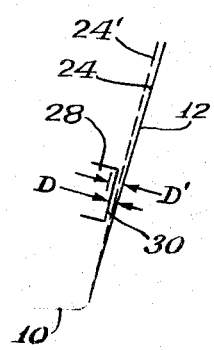
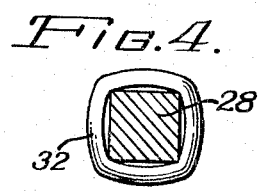
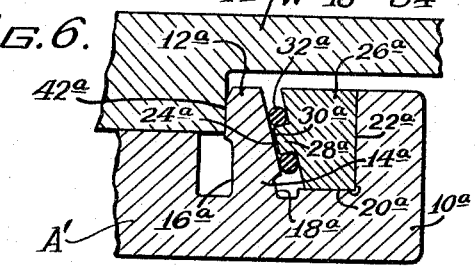

United States Patent Office 3,325,161
Patented June 13, 1967

3,325,161
STATIC LOCATING ARBOR
Meral Calvin Irish, Richmond, Ind., assignor to National Automatic Tool Company, Inc., Richmond, Ind., a corporation of Indiana
Filed Nov. 23, 1964, Ser. No. 413,250
6 Claims. (Cl. 269—47)

This invention relates to a locating arbor of the static type as distinguished from an arbor of the type having movable work-engaging members and a means to mechanically expand or contract them into contact with the work.

One object of the invention is to provide a locating arbor which comprises a base member formed of metal such as steel or the like and having integral spring fingers provided with work-engaging faces accurately ground to a diameter slightly different than a diameter of a workpiece to be engaged therewith so that the difference in diameter effects springing of the fingers as the workpiece is associated with the arbor, the fingers thereby frictionally holding the workpiece in an accurately centered position because of equal tension in the fingers.

Another object is to provide an arbor which is rugged in construction for supporting and accurately centering a workpiece engaged with the spring fingers thereof, means being provided to eliminate the possibility of springing the fingers beyond their elastic limit.

Still another object is to provide back stop means for the spring fingers of the arbor which are rigidly carried by the base member and have stop faces spaced closely with respect to stop faces of the spring fingers opposite those faces that engage the work, the distance between such closely spaced faces being less than that required to bend the spring fingers beyond their elastic limit, thereby preventing destruction of the fingers or impairing their operation.

A further object is to provide one of the stop faces as a projection of limited area, an O-ring being positioned to surround the projection and thereby prevent the entrance of foreign material that might get between the stop faces and prevent proper operation of the spring fingers.

With these and other objects in view, my invention consists in the construction, arrangement and combination of the various parts of my static locating arbor, whereby the objects above contemplated are attained, as hereinafter more fully set forth, pointed out in my claims and illustrated in detail on the accompanying drawing, wherein:

FIG. 1 is a plan view of a static locating arbor embodying my invention and showing a portion of a workpiece overlying the same;

FIG. 2 is a sectional view thereof substantially on the line 2—2 of FIG. 1;

FIG. 3 is an enlargement of a portion of FIG. 2 to show the details more clearly;

FIG. 4 is an enlarged sectional view on the line 4—4 of FIG. 3 to show a foreign matter seal used in conjunction with the arbor;

FIG. 5 is a diagram to illustrate certain dimensions of related parts in the arbor; and FIG. 6 is a sectional view similar to FIG. 3 showing a reversal of parts for engaging an external diameter of a workpiece instead of a bore thereof as in the previous figures.

On the accompanying drawing I have used the reference character A to indicate in general my static locat erence character A to indicate in general my static locating arbor and W a workpiece to be located thereby. The arbor A comprises a disc-like base member 10 of metal such as spring steel or the like having a plurality of upstanding spring fingers 12 which as shown in FIG. 3, are formed integrally with the base member 10 as by lathe turning or the like, portions of the disc being cut away to form the individual fingers 12 which extend radially as illustrated in FIG. 1. The fingers are upstanding from the base member 10 and tapered as shown in FIG. 3 for efficient bending action. The thrust of the spring fingers 12 (exerted radially outward) may be controlled by the cross section in a spring area 14, such area being increased by grinding grooves 16 and 18 shallower than those illustrated, or decreased by deeper grooves. The grooves 16 and 18 thus serve as thrust control grooves for the fingers 12.

FIG. 2 illustrates the workpiece W as having a bore 42 to fit over work-contacting faces 48 of the spring fingers 12 and these faces may be accurately ground to a diameter, for instance, .0005" greater than the diameter of the bore 42. By way of example, the workpiece W may be a flywheel weighing 90 pounds and each of the fingers 12 may provide a maximum thrust of 25 to 40 pounds when deflected .001". Thus, a total maximum thrust of 100 to 160 pounds is provided against the workpiece to hold it in position for machining operations. It is, accordingly, obvious that when the flywheel is positioned on the arbor as shown in FIG. 2, the bore 42 will contract the diameter of the faces 48 .001" and the outward thrust of each spring finger will accordingly be 12½ to 20 pounds (approximately) and since the spring fingers are of uniform composition, they will each spring equally and thus center the bore 19 of the flywheel with respect to the center of the arbor A. A flywheel weighing 90 lbs. may be lowered onto the arbor and the weight thereof is sufficient to spring the fingers 12 to permit reception in the bore 42.

The arbor A may be supported in an arbor support 34 such as a drill table, fixture for attachment to a drill table or a work-supporting table or some other type of machine tool which may be provided with a bore 36 to receive a shank 38 of the arbor A. Screws 40 may then be provided to mount the arbor on the arbor support. A drill in operation is shown at 46. In the case of a flywheel requiring a plurality of drilled holes 44 for mounting it on a flange of a crank shaft or the like, my arbor design is such that alternate holes may be drilled from opposite sides in case adjacent holes are too close to permit all the holes to be drilled from one side by a multiple-spindle drill.

The foregoing description assumes a difference of .001" in the diameters 48 and 42. This difference may be slightly more or slightly less and the arbor will still operate satisfactorily. The spring fingers 12, however, have an elastic limit which is illustrated diagrammatically in FIG. 5— when bent the distance D', for example. It is, therefore, desirable to have a stop face indicated at 30 opposite a stop face 24 of the spring finger which is distance D apart so that the spring finger can never be bent beyond its elastic limit. This distance D, for instance, may be .001" and the distance D' .0015". Accordingly, when the stop face 24 is moved toward the stop face 30 by a bore 42 of .001" less diameter than the diameter of the work-engaging faces 48, the surface 24 will assume the position indicated as 24'. It is now obvious that the final position 24' may vary somewhere between the arrowheads of the distance D and the device will still be operable, the outward thrust of the spring fingers, however, varying somewhat.

Since great accuracy is required in the spacing D of FIG. 5 and the stop face 30 must be rigid relative to the base member 10, the construction of the arbor is such as to provide a practical means for attaining the spacing D. This comprises the provision of a seat 20 for a stop block 26 and a shoulder 22 facing the finger 12 as shown in FIG. 3. The stop block may be secured to the base member 10 by a screw 27 and preferably has a projection 28 of limited area on which the stop face 30 is formed.

A convenient means for sealing out foreign material may be provided in the form of an O-ring 32 surrounding the projection 28 (as shown in FIG. 4) and slightly compressed to at all times fill the spacing between a shoulder 29 of the stop block and the stop face 24 of the spring finger. This keeps out foreign material that might get between the critical faces 24 and 30 and interfere with proper operation of the spring fingers, possibly causing one or more of them to spring less than the others and, therefore, inaccurately center the work with respect to the arbor.

The construction disclosed affords a practical means of accurately grinding the stop faces 24 and 30 in relation to each other and the work engaging faces 48 to an accurate diameter. First the surface 20 and 22 are ground flat as illustrated and the surfaces 24 are also ground flat. The surfaces 30 are then ground so that when the stop blocks 26 are mounted in position on the base member 10, they are parallel to the surfaces 24 and spaced .001" therefrom. Finally, the work-engaging surfaces 48 are ground after .001" shims are inserted between 24 and 30 thus preventing the possibility of the fingers being sprung inwardly during the grinding operation on the surfaces 48.

In FIGS. 1 to 5 I have illustrated an expanding type of arbor which requires contraction of the fingers in order for the workpiece to be positioned thereon. It is obvious that a workpiece having an outside diameter may be similarly located by means of a static contracting locating arbor in which the fingers are expanded to fit over a cylindrical surface of the work. This is illustrated in FIG. 6 wherein the work W' has an external diameter 42ª with which spring fingers 12ª of an arbor A' coact. Other portions of the arbor comparable to the previous figures bear the same reference numerals with the addition of the distinguishing characteristic a. Some of my claims are intended to cover this type of construction as well as that shown in FIGS. 1 to 5.

While I have described my locating arbor as used on a horizontal support 34, it can also be used on a vertical support such as the face plate of a lathe where work can be located by pushing it onto the arbor and will be centered in relation thereto unless it is so heavy that the weight thereof unevenly springs the locating fingers 12. For relatively light work, however, the springing would be so slight as to make insignificant the degree of off-center relationship of the work to the axis of rotation. The face 48 and any other parts of the arbor that require it may be induction hardened for long wear.

Some changes may be made in the construction and arrangement of the parts of my static locating arbor without departing from the real spirit and purpose of my invention, and it is my intention to cover by my claims any modified forms of structure or use of mechanical equivalents which may reasonably be included within their scope.

I claim as my invention:

1. In a static locating arbor, a metal base member having a plurality of integral upstanding circumferentially spaced spring fingers, said fingers having work engaging faces, the diameter of said faces being slightly different than the diameter of a portion of a workpiece to be positioned on said arbor, and back stop means rigidly carried by said base member adjacent each of said spring fingers and having a stop surface spaced therefrom a distance less than that required to bend said spring finger beyond its elastic limit, said spring fingers being tapered with their small ends farthest from said base member.

2. In a static locating arbor, a metal base member having a plurality of integral upstanding circumferentially spaced spring fingers, said fingers having work engaging faces, the diameter of said faces being slightly different that the diameter of a portion of a workpiece to be positioned on said arbor, and back stop means rigidly carried by said base member adjacent each of said spring fingers and having a stop surface spaced therefrom a distance less than that required to bend said spring finger beyond its elastic limit, said back stop means comprising for each spring finger a block secured to said base member, said base member having a shoulder facing toward said portion of a workpiece, said block being positioned against said shoulder with its face opposite said shoulder comprising said stop surface.

3. A static locating arbor according to claim 2 wherein said stop surface is formed as a projection from a limited area of said last mentioned face.

4. A static locating arbor according to claim 3 wherein an O-ring surrounds said projection and fills the space between said block and that face of the adjacent spring finger which faces said block.

5. In a static locating arbor, a metal base member having a plurality of integral upstanding circumferentially spaced spring fingers, said fingers having work engaging faces, the diameter of said faces being slightly different than the diameter of a portion of a workpiece to be positioned on said arbor and back stop means rigidly carried by said base member adjacent each of said spring fingers and having a stop surface spaced therefrom a distance less than that required to bend said spring finger beyond its elastic limit, said base member being grooved adjacent said spring fingers to control the radial thrust thereof.

6. In a static expanding locating arbor, a base member having a plurality of integral upstanding spring fingers spaced around a diameter thereof, certain faces of said fingers having a diameter slightly greater than the diameter of a bore of a workpiece to be engaged thereby, and back stop means comprising a block rigidly secured to said base member adjacent each of said spring fingers, located radially inward thereof and having a stop face spaced from the back surface of said spring finger a distance less than that required to bend said finger beyond its elastic limit.

References Cited

UNITED STATES PATENTS

| | | | |
|---|---|---|---|
| 2,724,162 | 11/1955 | Fenton | 24—216 |
| 3,173,473 | 3/1965 | Loveland | 24—214 |
| 3,179,969 | 4/1965 | Glynn | 24—214 |

WILLIAM W. DYER, JR., *Primary Examiner.*

W. D. BRAY, *Assistant Examiner.*